United States Patent [19]

Fan et al.

[11] Patent Number: 5,779,464
[45] Date of Patent: Jul. 14, 1998

[54] CALCIUM CARBONATE SORBENT AND METHODS OF MAKING AND USING SAME

[75] Inventors: Liang-Shih Fan; Abhijit Ghosh-Dastidar; Suhas Mahuli, all of Columbus, Ohio

[73] Assignee: The Ohio State University Research Foundation, Columbus, Ohio

[21] Appl. No.: 584,089

[22] Filed: Jan. 10, 1996

[51] Int. Cl.[6] .............................. B01J 8/00; B01J 20/00; C02F 1/42

[52] U.S. Cl. ............... 423/244.08; 423/430; 423/432; 423/165; 210/688; 502/400; 502/183; 502/340; 502/514

[58] Field of Search ...................... 502/400, 340, 502/183, 514; 423/244.08, 165, 430, 432; 210/688

[56] References Cited

U.S. PATENT DOCUMENTS

| | | | |
|---|---|---|---|
| 4,533,532 | 8/1985 | Gebhard et al. | 423/244.08 |
| 4,729,889 | 3/1988 | Flytani-Stephanopoulos et al. | 502/400 |
| 5,160,715 | 11/1992 | Pinnavaia et al. | 423/244.08 |
| 5,275,739 | 1/1994 | Grant et al. | 210/682 |

OTHER PUBLICATIONS

Milne et al., High–Temperature, Short–Time Sulfation of Calcium–Based Sorbents, *Ind. Eng. Chem. Res.*, vol. 29, No. 11, pp. 2201–2214 (1990).

Borgwardt, Sintering of Nascent Calcium Oxide, *Chemical Engineering Science*, vol. 44, No. 1, pp. 53, 60 (1989).

Kirchgessner, D. A., & Jozewicz, W., Enhancement of Reactivity in Surfactant–Modified Sorbents for Sulfurdioxide Control, *Ind. Eng. Chem. Res.*, 28(4), pp. 413–418 (1989).

Raghunathan et al. Raghunathan K., A Ghosh–Dastidar, and L.–S. Fan, A Technique for the Study of Ultrafast Gas–Solid Reactions for Residence Times less than 100 ms, *Rev. Sci. Instrum.*, 63(11), 5469 (1992).

Ghosh–Dastidar, et al. Ghosh–Dastidar, A., Mahuli S., Agnihotri, R., and Fan, L.–S., Ultrafast Calcination and Sintering of Ca(OH)2 powder: Experimental & Modeling, *Chem. Eng. Sci.*, vol. 50, No. 13, pp. 2029–2040, (1995).

Kirchgessner, Lorrain, Lignosulfonate–Modified Calcium Hydroxide for Sulfur Dioxide Control,m*Ind. Eng. Chem. Res.,* 1987, 26, pp. 2397–2400.

B.K. Gullett, K.R. Bruce. Pore Distribution Changes of Calcium–Based Sorbents Reacting with Sulfur Dioxide, *AIChE Journal*, Oct. 1987, vol. 33, No. 10, pp. 1719–1726.

K.R. Bruce, B.K. Gullett, L.O. Beach, Comparative SO2 Reactivity of CaO Drived from CaCO3 and Ca(OH)2, *AIChE Journal*, Jan. 1989, vol. 35, No. 1, pp. 37–41.

A. Ghosh–Dastidar, S. Mahuli, R. Agnitiotri and L.–S. Fan, Selenium Capture Using Sorbent Powders: Mechanisms of Sorption by Hydrated Lime. Sep. 11, 1995.

*Primary Examiner*—Glenn Caldarola
*Assistant Examiner*—In Suk Bullock
*Attorney, Agent, or Firm*—Standley & Gilcrest

[57] ABSTRACT

A novel $CaCO_3$ sorbent with its physical properties tailored for high $SO_2$ removal is produced in accordance with the present invention. The surface area, porosity and the distribution of pore sizes of the sorbent have been designed and controlled to give rise to the optimum internal structure necessary for high $SO_2$ removal. The $CaCO_3$ sorbent possesses 60 $m^2/g$ surface area and 0.18 cc/g pore volume and exhibits extraordinary reactivity towards $SO_2$ (70% utilization in 530 milliseconds at 1080° C. and 3900 ppm $SO_2$ concentration) when compared with other carbonate and hydrate sorbents in our laboratory reactor system. The sorbent may be produced by precipitation in a slurry bubble column reactor system and preferably contains about 2% by weight of a surfactant which is added during its preparation and improves the properties of $CaCO_3$ in the course of precipitation. The high utilization of this tailored $CaCO_3$ sorbent makes it a very strong potential sorbent for dry sorbent injection technology.

25 Claims, 6 Drawing Sheets

CALCIUM CARBONATE SORBENT AND METHODS OF MAKING AND USING SAME

TECHNICAL FIELD

The present invention is in the field of chemical sorbents.

BACKGROUND

In Furnace Sorbent Injection (FSI) Technology, calcium-based (i.e., calcium, hydroxide, $Ca(OH)_2$ or calcium carbonate, $CaCO_3$) sorbent powders are injected into the upper-furnace region of a coal-fired boiler to control $SO_2$ emission. Emission of $SO_2$ has long been associated with severe environmental problems such as acid rain. In spite of being cost-effective and easily retrofittable in the existing utility plants, the FSI process fails to be competitive with other more expensive $SO_2$ control technologies due to its poor $SO_2$ removal efficiency. Only a maximum of 60–70% of $SO_2$ capture (at Ca/S=2) could be achieved by this technique with various pure and chemically promoted calcium-based sorbents; falling far short of the 90% to 95% sulfur removal goal, as mandated by the Clean Air Act of 1990.

Upon injection into the furnace, the sorbent removes $SO_2$ by a two-step reaction process. First, the sorbent decomposes into CaO (by a calcination reaction):

$$Ca(OH)_2(solid) \rightarrow CaO(solid) + H_2O(gas) \quad (1a)$$

$$CaCO_3(solid) \rightarrow CaO(solid) + CO_2(gas) \quad (1b)$$

CaO then reacts with $SO_2$ in presence of oxygen to produce $CaSO_4$, (by a sulfation reaction):

$$CaO(solid) + SO_2(gas) + \tfrac{1}{2}O_2(gas) \rightarrow CaSO_4(solid) \quad (2)$$

Another important phenomenon influencing the $SO_2$ removal is the sintering of the CaO. Sintering of CaO reduces the available surface area and porosity for the ensuing sulfation reaction; and therefore the rate at which CaO sinters greatly determines the rate of sulfation.

The performance of a particular calcium-based sorbent is influenced by a number of factors, all of which play a crucial role in determining the overall reactivity of the solid. Particle size is an important parameter because large particle size induces transport limitations for both the calcination and sulfation reactions. However, below 5 μm, particle size ceases to be a determining factor in the overall sulfur capture, as resistance to heat and mass transfer become insignificant below such a small size. See Milne et al., High-Temperature, Short-Time Sulfation of Calcium-Based Sorbents, *Ind. Eng. Chem. Res.*, Vol. 29, No. 11, pp. 2201–2214 (1990), hereby incorporated herein by reference. Previous work of Borgwardt, Sintering of Nascent Calcium Oxide, *Chemical Engineering Science*, Vol. 44, No. 1, pp. 53, 60 (1989), hereby incorporated herein by reference, has reported that the rate of sintering depends on the type of initial sorbent (carbonate or hydroxide) and also on the foreign ion concentration or impurities in the parent solid. Borgwardt observed that CaO derived from carbonate (c-CaO) sinters slower than hydroxide-derived CaO (h-CaO), and also that the sintering rate is accelerated with increasing concentration of foreign ions.

The foregoing suggests that if adequately small particles are used to eliminate transport resistance during the reactions, calcium carbonate particles should yield higher sulfur capture than the hydroxide particles because of a relatively slow sintering of its oxide. However, in both laboratory and pilot-scale studies (See Milne et al., 1990; and Bortz and Flament, Recent IFRF Fundamental and Pilot Scale Studies on the Direct Sorbent Injection Process, proceedings: *First Joint Symposium on Dry $SO_2$ and Simultaneous $SO_2$—$NO_x$ Control Technologies*, Vol. 1, EPA-600/9-85/020a, pp. 17-1–17-22 (1985), hereby incorporated herein by reference, hydroxides have consistently shown higher sulfur capture than the carbonates, which can be explained by a comparison of the surface area, pore volume, and pore size distribution of the parent sorbents. Carbonate powders are usually non-porous and possess extremely low surface area, with a typical value of less than 2 to 3 $m^2/gm$. The calcium oxide it produces consequently exhibits a pore size distribution consisting of predominantly smaller pores (<50 A° in radius), since most of them grow from very small pores or cracks inside the carbonate particle.

Based on experimental observations, it is widely accepted that there exists an optimum pore size range (typically about 100 to 200 A° diameter) for sulfur capture which provides sufficient surface area for the sulfation reaction to occur without causing rapid pore filling and pore-mouth plugging that can lead to a premature reaction termination in the smaller pores. As a result, the overall reactivity of low-surface area, low-porosity carbonates is believed to result from such predominantly smaller pores in their calcines. On the other hand, the typical calcium hydroxide sorbents possess an initial surface area of about 12 to 18 $m^2/gm$ and a corresponding well-defined initial pore structure, which on calcination produces a number of pores in the optimum size range. It is to be noted that for pores larger than 200 A°, surface area to pore volume ratio progressively diminishes, and in spite of an excellent porosity value, the CaO may suffer from relatively lower surface area for the sulfation reaction.

The sulfur capture ability of a sorbent is greatly influenced by the surface area of its calcined product CaO; the higher the surface area, the greater is the reaction rate between $SO_2$ and CaO. However, CaO reactivity is lost not only by losing surface area due to the sulfation reaction, but also by grain coalescence due to high temperature-induced sintering. The general understanding of the research community to date was that to achieve higher sorbent conversion, a high CaO nascent surface area along with a slower sintering rate is necessary. Various work including our previous research concentrated on producing modified calcium hydroxide powders, which resulted in the synthesis of calcium lignosulfonate-modified hydroxide powder with high initial surface area of greater than 60 $m^2/gm$. However, this powder showed only a marginal improvement in sorbent conversion in 500 ms (38% compared to 32% for pure hydroxide). See Kirchgessner, D. A., & Jozewicz, W., Enhancement of Reactivity in Surfactant-Modified Sorbents for Sulfurdioxide Control, *Ind. Eng. Chem. Res.*, 28(4), pp. 413–418 (1989), hereby incorporated herein by reference.

The discussion of the previous section comparing calcium hydroxide and carbonate sorbents indicates that hydrates show superior reactivity in laboratory and pilot-scale studies because of their more open initial structure, which shifts the pore sizes of the h-CaO to a relatively favorable distribution. Nevertheless, a faster sintering in h-CaO prevents it from realizing a very high sorbent utilization, typically yielding 32 to 38% conversion in 1 to 2 seconds.

It is therefore an object of the present invention to produce an improved sorbent in the form of a calcium carbonate solid with an open initial pore structure, which can then result in an optimum pore size distribution upon decomposition. The slower sintering of its calcined product would provide adequate contact area for $SO_2$ capture for a longer time and yield a very high sorbent utilization before the rate-retarding phenomena such as pore filling and pore-mouth plugging drastically slow the reaction rate.

Unfortunately, in spite of an abundance of calcium carbonate in nature, all the known carbonate sorbents are typically non-porous and fail to exhibit the desired structural properties for high $SO_2$ capture. It is therefore an object of the present invention to produce such a sorbent by chemical or physical methods.

Commercially, calcium carbonate powders are prepared for many industrial uses such as fillers and extenders in the paper, paints and plastics manufacturing industries. In the paper industry for example, the typical usage is to increase opacity and brightness of paper while increasing its bulk. For such applications, the properties of carbonate that are crucial and are optimized by manufacturers include fineness of particle size, uniformity of product size distribution, optical properties (opacity, refractive index, etc.) and product purity. However, the properties desired in $CaCO_3$ for $SO_2$ removal application are quite different.

Although the advantages of the present invention are described with respect to its use in the removal of sulfur dioxide, the use of the sorbent of the present invention is not limited to that use, as reflected in the following disclosure. The disclosure of the present invention and its use may make apparent other advantages and the solution to other problems in the chemical sorbent field.

SUMMARY OF THE INVENTION

The present invention includes a calcium carbonate sorbent, and methods of its manufacture and use.

Fundamentally, the present invention is directed to the development of a $CaCO_3$ sorbent for $SO_2$ removal (although other uses are anticipated), and hinges on optimizing two properties very crucial for high $SO_2$ capture: (i) high surface area (S), and (ii) high surface area to pore volume (P) ratio, i.e., S/P.

The latter criterion has been developed from a fundamental understanding of internal pore structure and evolution of pore size distribution. A brief discussion of the conception and application of these criteria follows.

Consider two parent $CaCO_3$ powders, $Carb_1$ and $Carb_2$, of the same high surface area but different pore volumes, such that, $$S_1=S_2, \text{ but } P_1<P_2 \qquad (3)$$

Thus, $Carb_1$, possesses a higher S/P ratio than $Carb_2$. Let $r_1$ and $r_2$ be the average pore radii of these powders. Since most of the surface area is internal, $$S=2\pi rn \qquad (4)$$

$$P=\pi r^2 n \qquad (5)$$

where n is the total length of the pore system. From equations (3), (4) and (5), it can be seen that, $$r_1<r_2 \qquad (6)$$

Thus, parent $Carb_1$ possesses pores of smaller average radii. Now consider a single pore of radius r on the inner surface of which, calcination takes place. Due to the formation of a lower volume product, CaO, there is loss of mass from the inner surface of the pore leading to increase in its inner radius by $\Delta r$. During calcination reaction, the rate of decomposition is directly proportional to the available surface area inside the pore.

Rate of calcination=$k_1[(r+\Delta r)^2-r^2]\alpha$ Surface area=$k_2r$, (7)

where $k_1$ and $k_2$ are constants. Hence, $$\Delta r=(k_2/2k_1)=\text{constant} \qquad (8)$$

so, $$S_{CaO}/S_{carb}=2\pi(r+\Delta r)/2\pi r=1+\Delta r/r \qquad (9)$$

Since $\Delta r$ is independent of pore size, as r decreases, $S_{CaO}$ increases, for a given $S_{carb}$, CaO of higher surface area is generated. Thus, a parent carbonate with smaller r (hence larger S/P) would generate a higher surface area CaO upon calcination.

A high surface area to pore volume ratio is also crucial from the perspective of generating pores of the optimum size range. A high S/P implies that most of the pores in the parent carbonate would be less than 100 A° in diameter. Upon calcination, these pores would increase in diameter and would most likely fall under the optimum size range of about 100 to 200 A°, which allows sufficient surface area for sulfation reaction without the pores becoming plugged or filled. On the contrary, if surface area to pore volume ratio is small, most of the pores in the parent carbonate might already be within the approximate 100 to about 200 A° range, and once calcined, pore diameters for a large number of pores shift to greater than 200 A°, which do not provide adequate surface area for the sulfation reaction.

With this theoretical basis, calcium carbonate sorbents possessing the above-outlined properties have been successfully generated using a wet-precipitation technique, i.e., by reacting calcium hydroxide powder with $CO_2$ gas in aqueous solution, preferably in the presence of trace quantities of surfactant. The preparation and testing of the sorbent, its properties, and its $SO_2$ reactivity experiments and results are described below.

Accordingly, the sorbent of the present invention comprises a calcium carbonate powder comprising powder particles having an average surface area above about 40 $m^2$/gram; with the powder particles having pores of an average pore volume, and the ratio of the average surface area to the average pore volume is in the range of from about 200 to about 350 $m^2$/cubic centimeter.

Preferably, the sorbent of the present invention is such that the average surface area is in the range above about 60 $m^2$/gram. It is also preferred that the average pore volume is in the range of above about 0.18 cubic centimeters per gram of the powder. In the preferred embodiment the sorbent additionally comprises at least one surfactant, preferably present at a concentration of at least about 2% by weight. The preferred surfactant(s) are those described as sodium salts of carboxyl acids, such as those commercially available under the trademark Dispex®, particularly Dispex® N40V.

Although they might be produced by other methods, it is preferred that the sorbents of the present invention be produced by precipitation from a solution of calcium hydroxide.

The present invention also includes a process for making a calcium carbonate sorbent which includes the steps of: (a) preparing a liquid suspension of calcium (II) ion; (b) subjecting that liquid suspension to a flow of carbon dioxide gas for sufficient time and at sufficient temperature so as to form calcium carbonate, wherein the concentration of the liquid suspension of calcium (II) ion in the suspension of step (a) is preferably at least about $4_{sat}$; (the subscript "sat" indicating the concentration of a saturated solution at standard temperature and pressure, with the preceding number indicated a multiplying factor), and wherein the flow rate of said flow of carbon dioxide gas is preferably at least about 0.48 liters/minute. Most preferably, the concentration of the liquid suspension of calcium (II) ion in the suspension of step (a) is at least about 16sat. It is also most preferred that the flow rate of the flow of carbon dioxide gas is at least about 2.4 liters/minute.

It is preferred that the process additionally comprises the addition of at least one surfactant, such as those mentioned above, during step (b).

The present invention also includes a process of removing sulfur dioxide from a gaseous flow. In general terms, the process of the present invention involves the steps of: exposing the gaseous flow to a sorbent of the present invention as described in its many basic and preferred embodiments herein, for sufficient time and at sufficient temperature so as to bind the sulfur dioxide to said sorbent. The process of the present invention may be carried out using known techniques and parameters for using such sorbents as is known in the art.

The present invention also includes a process of removing heavy metal(s) from a sample. Fundamentally, the process of the present invention involves the steps of: exposing a sample containing the heavy metal(s) to a sorbent of the present invention as described in its many basic and preferred embodiments herein, for sufficient time and at sufficient temperature so as to bind the heavy metal(s) to the sorbent. The process of the present invention may be carried out using known techniques and parameters for using such sorbents as is known in the art. The sample may be, and generally will be in a gaseous or liquid form, and the sorbent may be brought in contact with the sample through techniques known in the art.

One of the objects of the present invention is to develop a calcium-based sorbent with optimum structural properties (surface area, pore volume, pore size distribution) to enhance its capability for capturing sulfur dioxide from hot flue gas. Currently, a maximum sorbent conversion of 30 to 40% (at Ca/S=2) is achieved with all the known calcium-based sorbents (hydroxide or carbonate) within the available solid residence time of 1 to 2 seconds in the favorable reaction temperature window of 800° to about 1200° C.

The sulfur dioxide and/or heavy metals adsorbed by the sorbents of the present invention may be released, and the sorbents regenerated, through techniques known in the art.

DETAILED DESCRIPTION OF THE PREFERRED EMBODIMENT

In accordance with the foregoing summary of the invention, the following presents a detailed description of the preferred embodiment, which is presently considered to be the best mode of the invention as applied to the production and use of a calcium carbonate sorbent for the removal of sulfur dioxide from a gaseous waste stream.

SORBENT PREPARATION AND CHARACTERIZATION

A calcium carbonate powder sorbent may be produced by a wet precipitation technique in a slurry bubble column reactor system. The process entails reacting calcium hydroxide ($Ca(OH)_2$) powder with $CO_2$ gas in aqueous solution, preferably in presence of trace quantities of surfactant. A 15 inch long plexiglas column of about 2 inches O.D. may be used as the reactor. The column is fitted with a ceramic filter at the bottom for uniform gas distribution. The $Ca(OH)_2$ concentration in the solution (e.g., 25.6 gms. in 1 liter), the amount of the surfactant (e.g. Dispex®N40V as 2% by wt. of calcium hydroxide), and the $CO_2$ flow rate (5 SCFH at STP) may be established as optimum reaction conditions to tailor the specific properties, namely, surface area, pore volume, and pore size distribution of the precipitated $CaCO_3$. The $CaCO_3$ powder may be filtered and dried overnight in a vacuum oven (at 75° C.), and then ground to produce fine particles.

The powder was then tested in a high-temperature, entrained-flow reactor to examine its effectiveness in capturing $SO_2$. The sorbent shows a 70% conversion to calcium sulfate ($CaSO_4$,) in only 530 ms at a reaction temperature of 1080° C. This is nearly twice the conversion obtained with standard calcium-based sorbent, currently employed as the solid for high-temperature sorbent injection process to control $SO_2$ emission.

Figure 1:
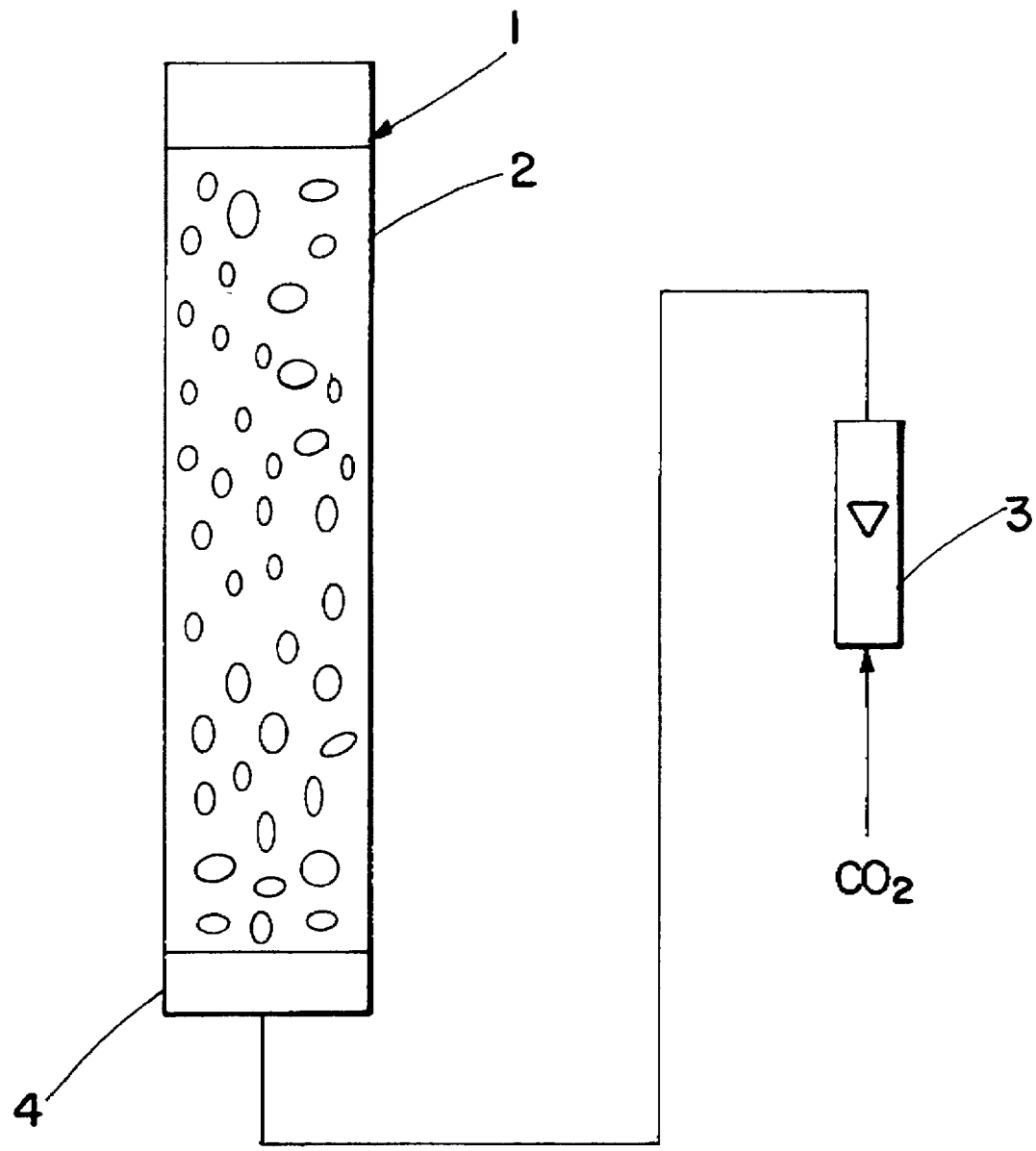
FIG. 1 is a schematic of a slurry bubble reactor used to make the sorbents in accordance with one embodiment of the present invention.

A schematic of the laboratory-scale column 1 is shown in FIG. 1. An aqueous suspension of calcium hydroxide 2 is used as the slurry medium, and $CO_2$, supplied through rotameter 3 is used to bring about the carbonation reaction. Typical dimensions of the apparatus shown in FIG. 1 include a capacity of the column of 1 liter, with a diameter of 6.6 cm and a height of 38 cm. A sintered glass plate 4 fused to the bottom of the column may serve as the gas distributor. The $CO_2$ is bubbled through the suspension for a sufficient time to lead to the formation and precipitation of $CaCO_3$; typically 5 to 25 minutes for the concentrations used herein. This can be readily ascertained by the change in the appearance of the slurry, i.e. by a thicker, more viscous appearance in the slurry. The carbonate suspension may then be filtered and dried in a vacuum oven for a period of time (typically at least 6 hours under vacuum at 70 degrees Centigrade for about 25 to 50 grams of sorbent; this may be scaled up using industrial drying equipment, such fluidized bed dryers). The various parameters which affect the carbonate formation and its physical properties are the $Ca(OH)_2$ concentration, the $CO_2$ flow rate, the time of carbonation and the presence of any additives.

Figure 2:
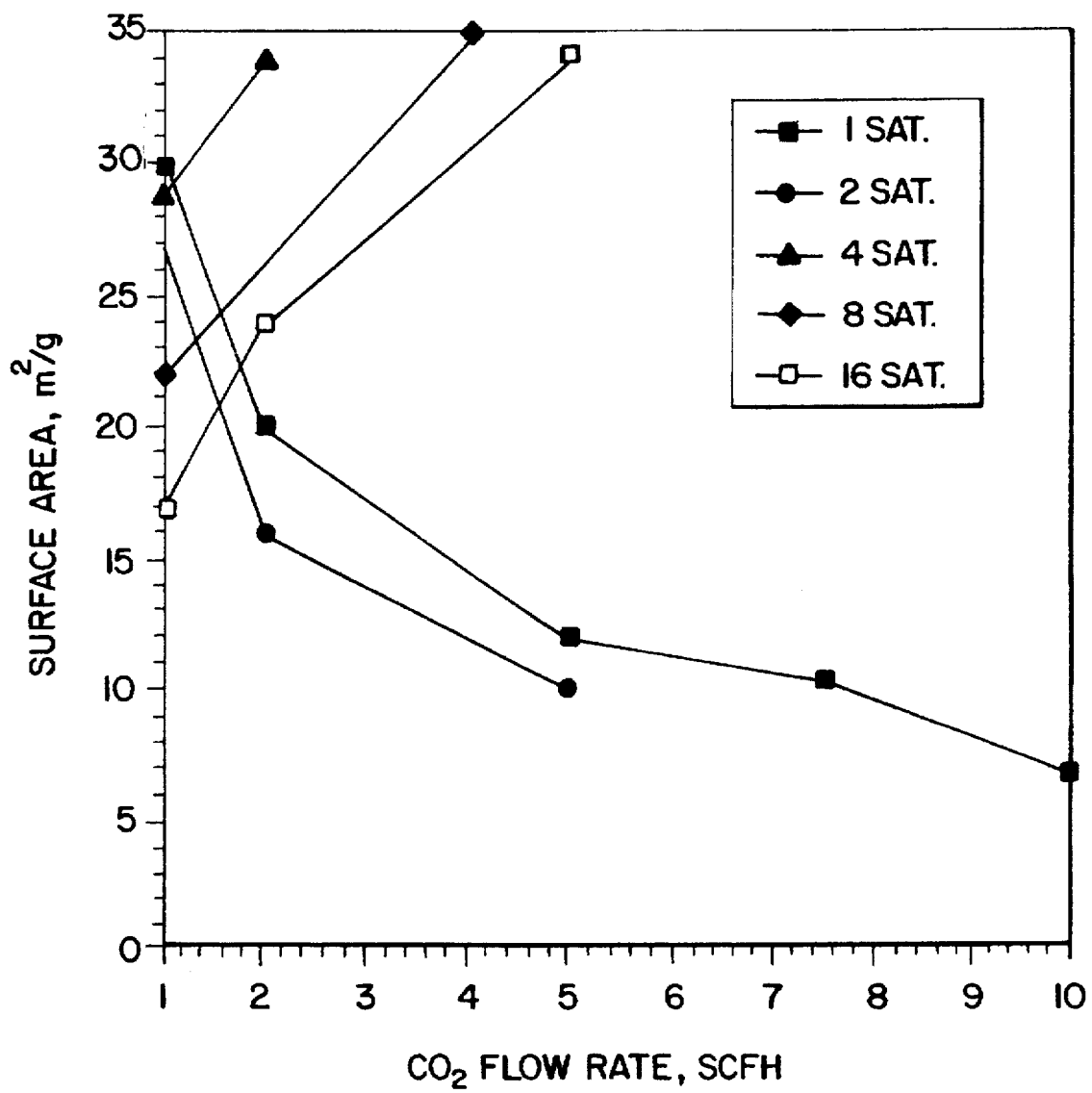
FIG. 2 is a chart showing the relationship between the surface area of the particles of a calcium carbonate sorbent produced in accordance with one embodiment of the present invention, to the flow rate of carbon dioxide at various concentrations of the slurry from which the sorbent is precipitated.

Various parametric studies were conducted in order to identify the optimum conditions for preparing $CaCO_3$ with properties outlined earlier. These parametric tests included varying the Ca(OH)$_2$ concentration from saturation, 1.6 g/lit (at 1$_{sat}$) to 25.6 g/lit (at 16$_{sat}$), and the CO$_2$ flow rate from 0.24 lpm to 2.4 lpm. FIG. 2 shows the variation of CaCO$_3$ surface area with CO$_2$ flow rate at specific concentrations. As can be seen, at saturation conditions or slightly above saturation (up to 2$_{sat}$), high CO$_2$ flow rates (greater than 0.48 lpm) are not favorable for obtaining good surface area. On the contrary, at higher slurry concentrations of 4$_{sat}$ and above, there exists an optimum CO$_2$ flow rate which gives a maxima in the surface area of the final precipitated product.

The conditions of 16$_{sat}$ at concentration and 2.4 lpm CO$_2$ flow rate are seen to give nearly 35 m$^2$/g surface area. The CaCO$_3$ properties were further improved by adding a small quantity of dispersing agent or surfactant during the precipitation process. Ionic surfactant additives are known to act as dispersing agents in aqueous systems leading to reduced agglomeration of crystallites. The additive used may be an anionic surfactant such as Dispex® (commercially available from Allied Colloids Inc. of Suffolk, Va.), which is a sodium salt of a polycarboxylic acid. Dispex® is a low molecular weight, water soluble surfactant and is obtained as a mobile liquid with 40% solids content. Although the invention is not limited to any theory of its operation, the surfactant is believed to produce a stabilizing and dispersing action by ionizing in water to produce a sodium cation together with a polyanion. This polyanion is believed to adsorb irreversibly onto the particle surface causing the particle to become negatively charged. Adjacent particles are thought then to repel one another to maintain a state of dispersion. The concentration of Dispex® in the Ca(OH)$_2$ slurry was about 2.0 wt % w.r.t. Ca(OH)$_2$.

Figure 3:
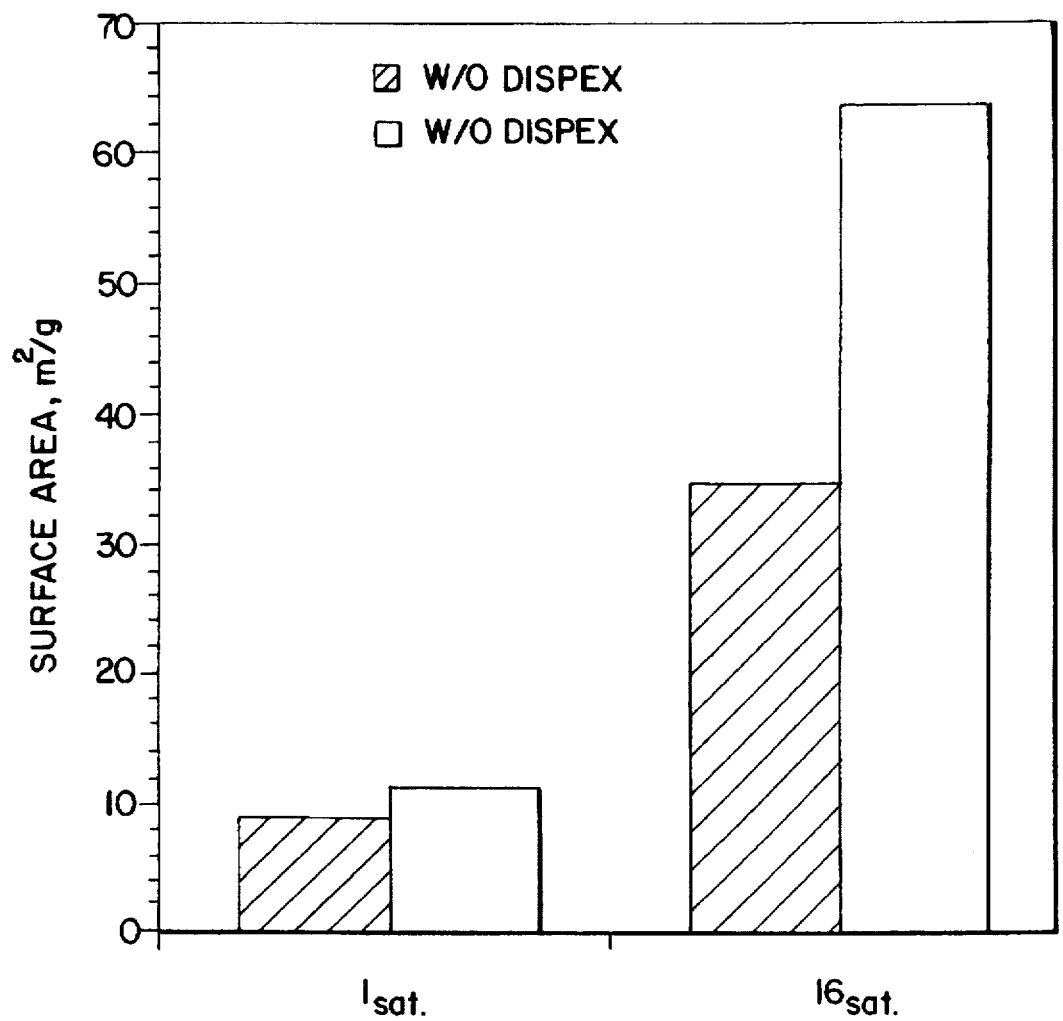
FIG. 3 is a chart showing the relationship between the surface area of the particles of a calcium carbonate sorbent produced in accordance with one embodiment of the present invention, to the presence of a surfactant at different concentrations of the slurry from which the sorbent is precipitated.

FIG. 3 shows how the presence of Dispex® leads to an increase in surface area of the carbonate. The sorbent produced under conditions of 16$_{sat}$ concentration with 2.4 lpm CO$_2$ flow rate in the presence of 2 wt % Dispex® is clearly an improved product with properties much superior to the products described in the prior art. Hence, all the further characterization and testing were performed with this sorbent possessing 60 m$^2$/g surface area and a pore volume of 0.18 cc/g (henceforth referred to as the "60pal8" sorbent).

Figure 4:
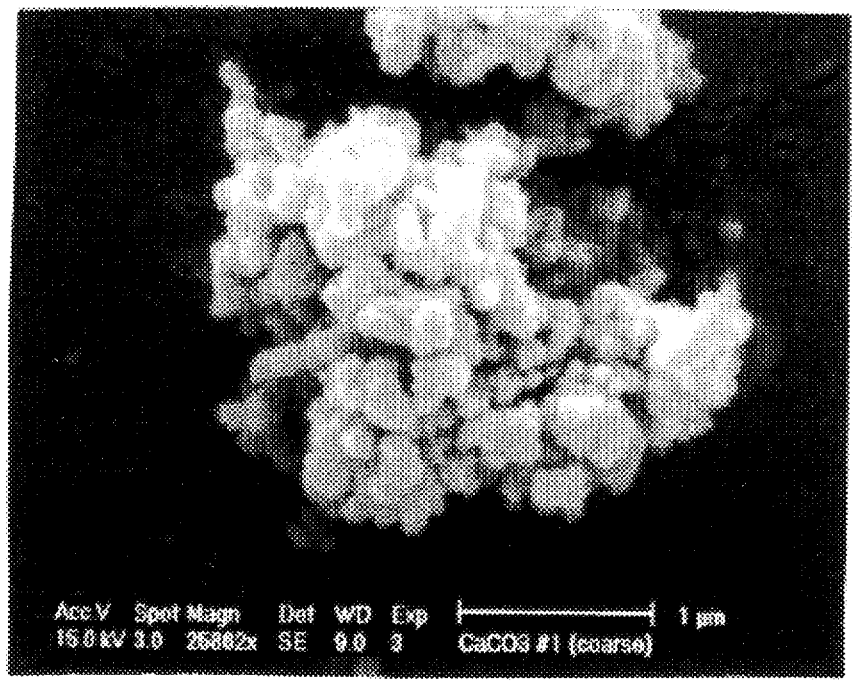
FIG. 4 is a scanning electron microscope micrograph of a $CaCO_3$ sorbent sample produced in accordance with one embodiment of the present invention.
Figure 5:
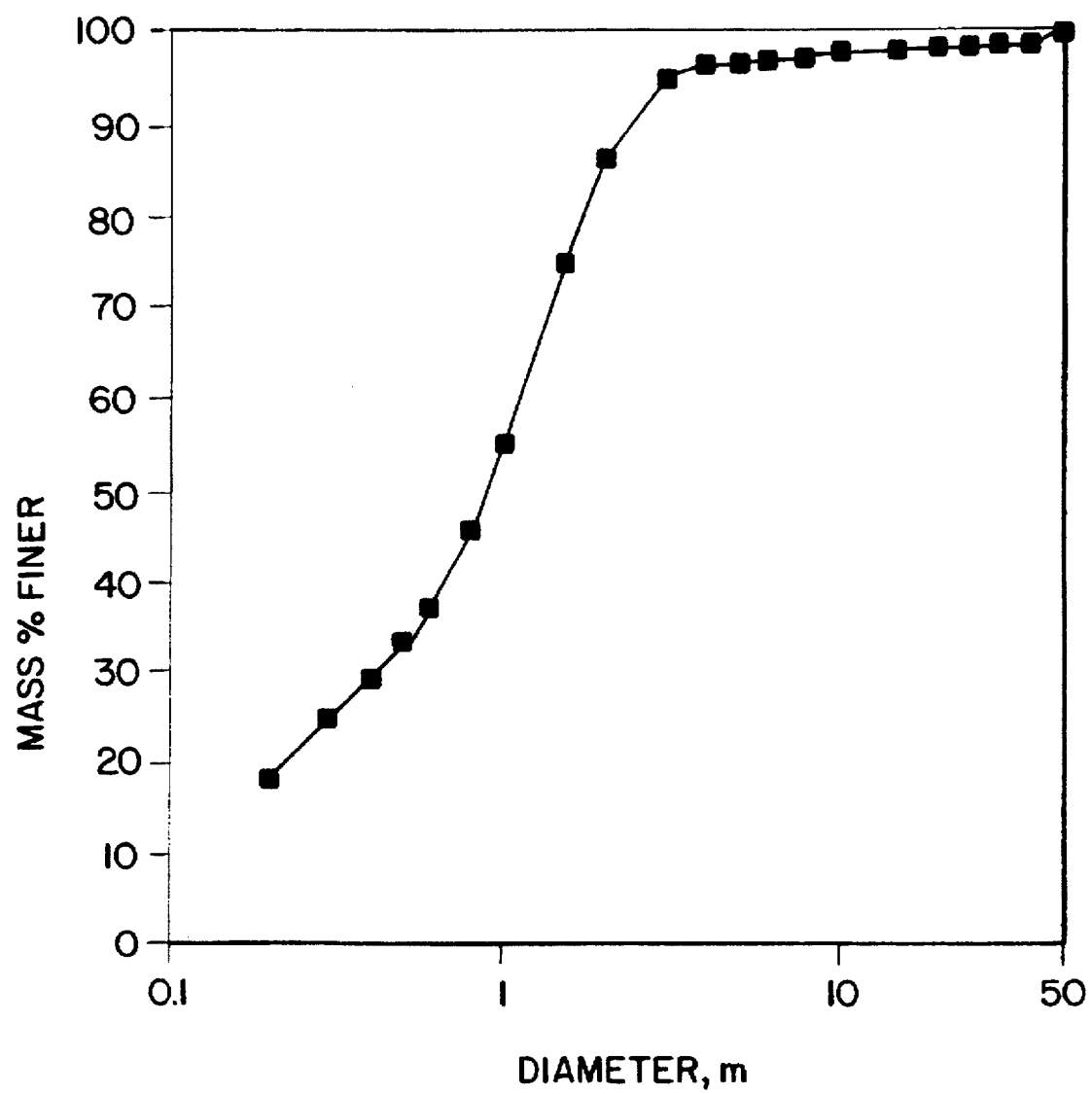
FIG. 5 is a chart showing the particle size distribution of a $CaCO_3$ sorbent sample produced in accordance with one embodiment of the present invention.

Scanning Electron Microscope (SEM) studies, X-ray diffraction (XRD) studies, primary particle size distribution studies and pore size distribution studies were conducted with the 60pal8 sorbent. FIG. 4 shows the highly porous and granular nature of this carbonate powder. The powder is observed to possess a calcitic crystalline structure from XRD studies. From an analysis of the primary particle size distribution (using the Micrometrics Model 5100 Sedigraph analyzer) shown in FIG. 5, the mass median size (d$_{50}$) is about 0.9 µm.

REACTIVITY TESTING

The 60pal 8 sorbent is tested for its SO$_2$ removal ability in a reactor system. The reactor system is a drop-tube entrained flow reactor system equipped with a water-cooled powder injection and collection probes, on-line residence time measurement, and in situ particle sizing. A detailed description of the reactor system and its operation are given in Raghunathan et al. Raghunathan K., A. Ghosh-Dastidar, and L. S. Fan, A Technique for the Study of Ultrafast Gas-Solid Reactions for Residence Times less than 100 ms, Rev. Sci. Instrum., 63(11), 5469 (1992) and Ghosh-Dastidar et al. Ghosh-Dastidar, A., Mahuli, S., Agnihotri, R., and Fan, L. S., Ultrafast Calcination and Sintering of Ca(OH)$_2$ powder: Experimental & Modeling, Chem. Eng. Sci., Vol. 50, No. 13, pp. 2029–2040, (1995), both of which are incorporated herein by reference. The test runs are conducted under a SO$_2$ concentration of 3900 ppm which is representative of the SO$_2$ concentration in flue gas. The remaining components are 5.45% O$_2$ and the balance N$_2$. Experimental runs were conducted at a temperature of 1080° C. and for a solids residence time of 530 milliseconds. In order to compare the reactivity of the 60pal8 sorbent with other commonly used sorbents, tests are also conducted with a commercially available limestone (LC, Linwood CaCO$_3$), a calcium hydroxide (LH, Linwood Ca(OH)$_2$) and a modified hydrate (MH, 1.5% lignomodified Linwood hydrate). The modified hydrate was first developed at U.S. EPA (Kirchgessner and Jozewicz, 1989) in order to improve the reactivity of the pure hydrate. In their experiments, calcium lignosulfonate, an anionic surfactant was added to the water of hydration which was observed to increase utilization of the hydrate. The optimum lignosulfonate concentration was determined to be 1.5% which resulted in a 20% increase in utilization over the pure hydrate. In the present testing, the modified hydrate (NH) was prepared following a similar procedure detailed by Kirchgessner and Jozewicz (1989). Further, all the sorbents are tested under the same conditions of temperature, gas composition and residence time in order to do comparative analysis. Moreover, for all the sorbents, particles were classified in situ in a post reactor cyclone assembly. A mean size (aerodynamic) of 3.9 µm is analyzed for sorbent conversion using sulfate analysis in an Ion Chromatography (IC) system.

Figure 6:
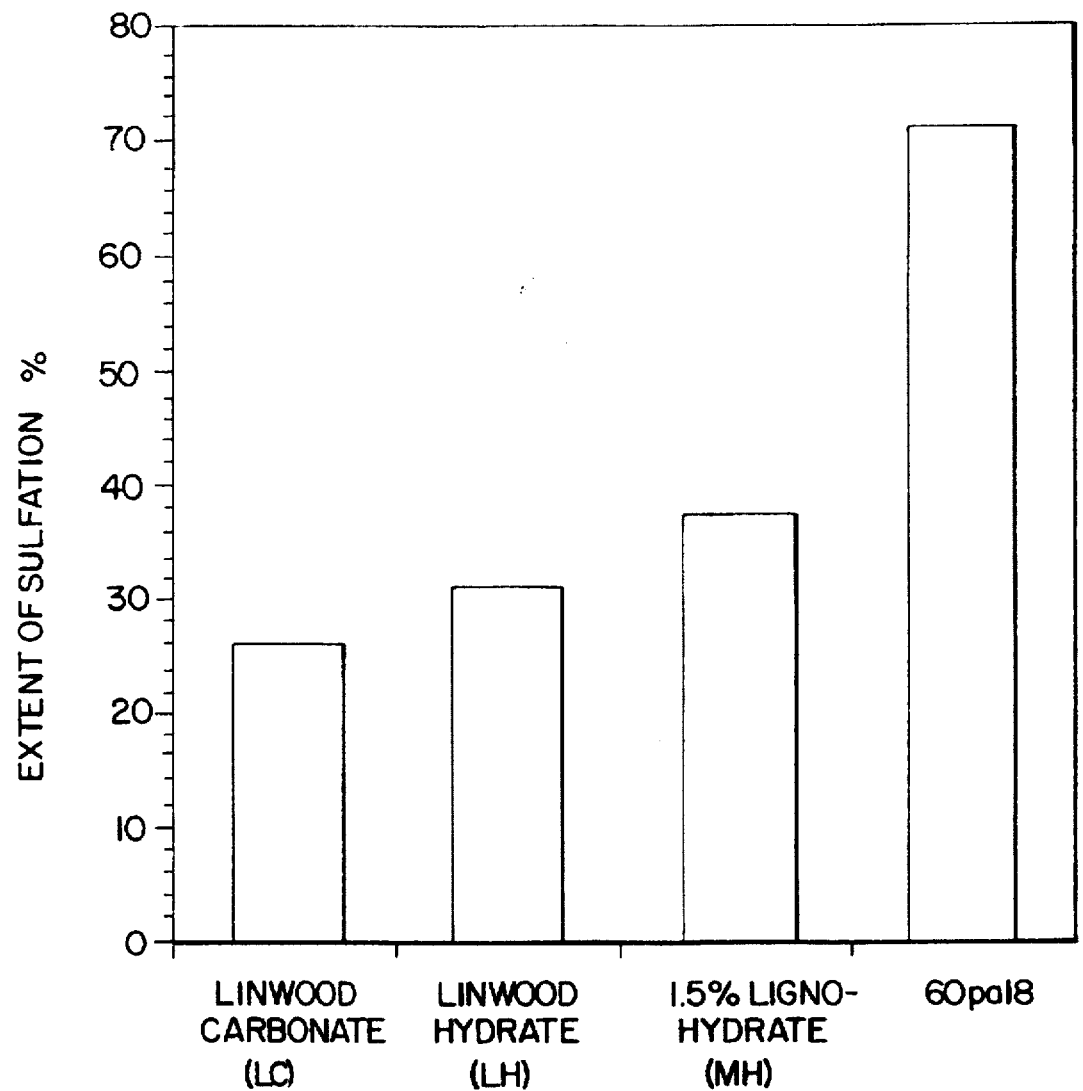
FIG. 6 is a chart comparing the performance, measured in terms of extent of sulfation, of a $CaCO_3$ sorbent sample produced in accordance with one embodiment of the present invention, to other sorbents of the prior art.

FIG. 6 shows the test results in terms of extent of sulfation of the sorbents. The extent of sulfation of 60pal 8 is nearly 70% compared with the 32%, 27% and 38% for the LH, LC and MH, respectively. The results obtained with the LH, LC and MH are consistent with data previously reported in the literature (See Milne et al., (1990); and Kirchgessner & Jozewicz, (1989)). This serves as a confirmation of the validity and reliability of the results obtained using the sorbent of the present invention. The repeatability of the results shown by 60pal 8 were confirmed by conducting multiple experiments under identical conditions, and by observing that the conversion lies within ±5% of the average. The true significance of the reactivity shown by the 60pal8 becomes clearer when expressed in terms of utilization under actual conditions. The experiments here were conducted under conditions differential with respect to SO$_2$. If the results are extrapolated to actual operating conditions with the Ca/S molar ratio of about 2, a sorbent conversion of 70% would lead to a very high SO$_2$ removal (>95%).

The sulfur capture ability of a sorbent is greatly influenced by the surface area of its calcined product CaO. The higher the surface area, the greater is the reaction rate between SO$_2$ and CaO. However, CaO reactivity is lost by not only losing surface area due to the sulfation reaction, but also by grain coalescence due to high-temperature induced sintering. The general understanding of the research community to date was that to achieve higher sorbent conversion, a high CaO nascent surface area along with a slower sintering rate is necessary. Earlier work concentrated on producing modified calcium hydroxide powders, which resulted in the synthesis of calcium lignosulfonate-modified hydroxide powder with high initial surface area of greater than 60 m$^2$/gm. However, this powder showed only a marginal improvement in sorbent conversion in 500 ms (38% compared to 32% for pure hydroxide).

The experiments with Linwood carbonate (very low surface area carbonate obtained from Linwood Mining & Minerals Co.) showed that though this powder showed a poor conversion, its calcined form, CaO, possesses high initial surface area and retains this high value for a longer time than the calcium hydroxide-derived CaO, by undergoing a slower sintering. In its case, the unfavorable pore size distribution is responsible for poor SO$_2$ capture rather than a drastic loss of surface area due to rapid sintering.

Thus, it was determined that if a calcium carbonate powder with optimum pore structure (which on calcination will give rise to CaO again with favorable pore size distribution) is synthesized and employed for $SO_2$ capture, that may result in very high sorbent conversion, and hence considerably high $SO_2$ capture.

Accordingly, the sorbents of the present invention are shown to give demonstrable advantages in the removal of $SO_2$, over the sorbents of the prior art. Such advantages may include:(1) relatively high $SO_2$ removal (up to 95% or more); (2) reduced sorbent requirements (may achieve >95% $SO_2$ removal at Ca/S =1.5); (3) ability to enhance use of high-sulfur coal; (4) the FSI process, which itself is low cost retrofittable technology can be made more economically attractive by improving its $SO_2$ removal performance; and (5) such highly reactive powder can have potential use in removing other toxic heavy metals and/or inorganics from hot flue gas or other media.

In view of the present disclosure, it will be within the ability of one of ordinary skill in the art to make modifications to the present invention, such as through insignificant changes in component materials, their concentrations and/or their physical or chemical parameters, in the process parameters, etc., to allow one to use the present invention without departing from the spirit of the present invention as reflected in the appended claims.

What is claimed is:

1. A sorbent comprising:

a calcium carbonate powder comprising powder particles having an average surface area above about 30 $m^2$/gram; said powder particles having pores of an average pore volume, and the ratio of said average surface area to said average pore volume is in the range of at least about 200 $m^2$/cubic centimeter.

2. A sorbent comprising:

a calcium carbonate powder comprising powder particles having an average surface area above about 40 $m^2$/gram; said powder particles having pores of an average pore volume, and the ratio of said average surface area to said average pore volume is in the range of from about 200 to about 350 $m^2$/cubic centimeter.

3. A sorbent according to claim 2 wherein said average surface area is in the range above about 60 $m^2$/gram.

4. A sorbent according to claim 2 wherein said average pore volume is in the range of above about 0.18 cubic centimeters per gram of said powder.

5. A sorbent according to claim 2 wherein said sorbent additionally comprises at least one surfactant.

6. A sorbent according to claim 5 wherein said sorbent comprises at least about 2% by weight of said at least one surfactant.

7. A sorbent according to claim 5 wherein said at least one surfactant is selected from the group consisting of a sodium salt of a polycarboxylic acid.

8. A sorbent according to claim 2 wherein said sorbent is produced by precipitation from a solution of calcium hydroxide.

9. A process for making a calcium carbonate sorbent, said process comprising the, steps of:

(a) preparing a liquid suspension of calcium (II) ion; and (b) subjecting said liquid suspension to a flow of carbon dioxide gas for sufficient time and at sufficient temperature so as to form calcium carbonate, wherein the concentration of said liquid suspension of calcium (II) ion in the suspension of step (a) is at least about $4_{sat}$; and wherein the flow rate of said flow of carbon dioxide gas is at least about 0.48 liters/minute, so as to form a calcium carbonate powder comprising powder particles having an average surface area above 30 $m^2$/gram; said powder particles having pores of an average pore volume, and the ratio of said average surface area to said average pore volume is in the range of at least about 200 $m^2$/cubic centimeter.

10. A process according to claim 9 wherein said concentration of said liquid suspension of calcium (II) ion in the suspension of step (a) is at least about $16_{sat}$.

11. A process according to claim 9 wherein the flow rate of said flow of carbon dioxide gas is at least about 2.4 liters/minute.

12. A process according to claim 9 wherein said process additionally comprises the addition of at least one surfactant during step (b).

13. A process of removing sulfur dioxide from a gaseous flow, said process comprising:

exposing said gaseous flow to a sorbent, said sorbent comprising calcium carbonate powder comprising powder particles having an average surface area above about 40 $m^2$/gram; said powder particles having pores of an average pore volume, and the ratio of said average surface area to said average pore volume is in the range of from about 200 to about 350 $m^2$/cubic centimeter, for sufficient time and at sufficient temperature so as to bind said sulfur dioxide to said sorbent.

14. A process according to claim 13 wherein said average surface area is in the range above about 60 $m^2$/gram.

15. A process according to claim 13 wherein said average pore volume is in the range of about 0.18 cubic centimeters per gram of said powder.

16. A process according to claim 13 wherein said sorbent additionally comprises at least one surfactant.

17. A process according to claim 13 wherein said sorbent comprises at least 2% by weight of said at least one surfactant.

18. A process according to claim 13 wherein said at least one surfactant is selected from the group consisting of sodium salts of a polycarboxylic acid and anionic surfactants.

19. A process according to claim 13 wherein said sorbent is produced by precipitation from a solution of calcium hydroxide.

20. A process of removing at least one heavy metal from a sample, said process comprising:

exposing said sample to a sorbent, said sorbent comprising calcium carbonate powder comprising powder particles having an average surface area above about 40 $m^2$/gram; said powder particles having pores of an average pore volume, and the ratio of said average surface area to said average pore volume is in the range of from about 200 to about 350 $m^2$/cubic centimeter, for sufficient time and at sufficient temperature so as to bind said at least one heavy metal to said sorbent.

21. A process according to claim 20 wherein said average surface area is in the range above about 60 $m^2$/gram.

22. A process according to claim 20 wherein said average pore volume is in the range of about 0.18 cubic centimeters per gram of said powder.

23. A process according to claim 20 wherein said sorbent additionally comprises at least one surfactant.

24. A process according to claim 23 wherein said sorbent comprises at least 2% by weight of said at least one surfactant.

25. A process according to claim 23 wherein said at least one surfactant is selected from the group consisting of sodium salts of a polycarboxylic acid and anionic surfactants.

* * * * *